US012749846B2

(12) United States Patent
Ludwig et al.

(10) Patent No.: US 12,749,846 B2
(45) Date of Patent: Sep. 29, 2026

(54) MALE MULTIPOINT CONNECTOR MAIN BODY FOR AN ELECTRIC PLUG CONNECTION

(71) Applicant: Robert Bosch GmbH, Stuttgart (DE)

(72) Inventors: Dieter Ludwig, Ludwigsburg (DE); Markus Menacher, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 18/684,980

(22) PCT Filed: Jul. 25, 2022

(86) PCT No.: PCT/EP2022/070761
§ 371 (c)(1),
(2) Date: Apr. 3, 2024

(87) PCT Pub. No.: WO2023/016788
PCT Pub. Date: Feb. 16, 2023

(65) Prior Publication Data

US 2025/0079751 A1 Mar. 6, 2025

(30) Foreign Application Priority Data

Aug. 12, 2021 (DE) ..................... 10 2021 208 878.3

(51) Int. Cl.
*H01R 13/518* (2006.01)

(52) U.S. Cl.
CPC .................................. *H01R 13/518* (2013.01)

(58) Field of Classification Search
None
See application file for complete search history.

(56) References Cited

U.S. PATENT DOCUMENTS 6,171,153 B1 1/2001 Belopolsky
8,038,454 B2 * 10/2011 Jiang .................... H01R 25/003
439/106

(Continued)

FOREIGN PATENT DOCUMENTS

DE 102013209441 A1 * 11/2014 ......... H01R 13/5202
DE 102015208628 A1 * 11/2016 ......... B29C 45/0081

(Continued)

OTHER PUBLICATIONS

International Search Report for PCT/EP2022/070761, Issued Nov. 18, 2022.

*Primary Examiner* — Tho D Ta
(74) *Attorney, Agent, or Firm* — Norton Rose Fulbright US LLP

(57) ABSTRACT

A male multipoint connector main body. The connector main body includes a plurality of plug receptacles which are open on one side, are arranged in an extension direction of the male multipoint connector main body, and are designed to receive plug-in elements. Each plug receptacle has an individual base plate. Between all adjacent plug receptacles, there is in each case a connection pocket which is open on one side and which interconnects thee adjacent plug receptacles. The plug receptacles, starting from a plane in which the base plates lie, protrude in a first direction and the connection pockets, starting from the plane, protrude in a second direction opposite the first direction. An open side of the connection pockets and an open side of the plug receptacles are oriented substantially in the same direction.

17 Claims, 6 Drawing Sheets

(56) References Cited

U.S. PATENT DOCUMENTS

| | | | | |
|---|---|---|---|---|
| 8,283,802 | B2 * | 10/2012 | Jansma ................ | H01R 25/006 439/654 |
| 9,876,306 | B2 * | 1/2018 | Kaesser ............... | H01R 13/504 |
| 10,680,398 | B1 * | 6/2020 | Irons .................... | H01R 25/003 |
| 2016/0118742 | A1 | 4/2016 | Akagi et al. | |
| 2020/0287336 | A1 * | 9/2020 | Irons ...................... | H01R 13/46 |
| 2020/0350658 | A1 * | 11/2020 | Park ..................... | H01Q 1/2283 |

FOREIGN PATENT DOCUMENTS

| | | | | |
|---|---|---|---|---|
| DE | 10 2019 216354 | A1 | 4/2021 | |
| EP | 2469660 | A2 | 6/2012 | |
| EP | 2760086 | A1 | 7/2014 | |
| EP | 3537308 | A1 | 9/2019 | |
| EP | 3540867 | A1 | 9/2019 | |
| JP | 2011044327 | A | 3/2011 | |
| JP | 2017130257 | A | 7/2017 | |
| JP | 2018206502 | A | 12/2018 | |
| WO | 2013103072 | A1 | 7/2013 | |
| WO | WO-2014139699 | A1 * | 9/2014 | ............. H01R 27/02 |

* cited by examiner

MALE MULTIPOINT CONNECTOR MAIN BODY FOR AN ELECTRIC PLUG CONNECTION

FIELD

The present invention relates to a male multipoint connector main body for an electric plug connection, in particular for a control device of a motor vehicle.

BACKGROUND INFORMATION

Male multipoint connectors or plug multipoint connectors or pin multipoint connectors for electric plug connectors are described in the related art. They consist, for example, of a male multipoint connector main body or a plug multipoint connector main body or a pin multipoint connector main body, which is usually designed as an insulator and into which electrically conductive blades, pins or generally contacting elements (usually so-called "male contacting elements") are inserted or shot in. For example, German Patent Application No. DE 10 2019 216354 A1 shows a male multipoint connector, a pin header or plug multipoint connector for simplified printed circuit board assembly. Due to the variable geometry elements of the male multipoint connector, shrinkage and/or a distortion can occur during the injection molding of the male multipoint connector main body, in particular in the case of high-pole male multipoint connectors for control devices in a motor vehicle. However, high dimensional requirements must be placed on the male multipoint connector main bodies. In the direction of a control device, a contacting of pins on a printed circuit board and sealing to the housing must be ensured. In the direction of a cable harness, contacting, locking and sealing to the mating connector must be ensured. Due to their size and non-symmetrical structure, the male multipoint connector is often subject to deflection along with severe distortion. To solve this problem, for example, isotropically shrinking plastics materials with glass beads are used as reinforcing elements. However, their strength is not sufficient for the requirements of a male multipoint connector of a motor vehicle. Furthermore, male multipoint connectors can also be produced in a two-component injection molding process. Although this can reduce distortion, it leads to complex tool technology and, in particular, to longer production times for the male multipoint connector.

SUMMARY

A male multipoint connector main body or plug multipoint connector main body according to the present invention may have the advantage that distortion and/or shrinkage and/or deflection of the male multipoint connector main body can be avoided or greatly reduced. Thus, the male multipoint connector main body has a particularly high dimensional accuracy. As a result, the high demands placed on male multipoint connectors used in vehicles in conjunction with control devices and the like can be met. The male multipoint connector main body can simply be produced by injection molding, for example. In such an exemplary case, it is particularly easy and inexpensive to produce and, in particular, suitable for mass production. Advantageously, materials that are not only isotropically shrinking materials are then available for production, which makes a much larger selection of materials possible for production. It is also advantageous to dispense with inserts, for example along a base plate.

According to the an example embodiment of the present invention, this is achieved by the male multipoint connector main body having a plurality of plug receptacles, which are open on one side, which are arranged in an extension direction of the male multipoint connector main body and which are designed to receive plug-in elements, for example of a cable harness. Each plug receptacle has an individual base plate. A connecting pocket, which is open on one side, is arranged between adjacent plug receptacles and interconnects these adjacent plug receptacles. For example, it can be provided that a connecting pocket, which is open on one side, is arranged between all adjacent plug receptacles in each case. Starting from a plane E, in which the base plates of the plug receptacles lie, the plug receptacles project in a first direction 21 and the connecting pockets project starting from the plane E in a second direction 22 in the opposite direction to the first direction 21. Furthermore, an open side of the connecting pockets and an open side of the plug receptacles are directed substantially in the same direction. This means that the two open sides are substantially parallel to one another.

The term "substantially in the same direction" means that the directions relative to one another can enclose an angle of up to 40°. Preferably, the angle is a maximum of 30°, more preferably a maximum of 20°, more preferably 10° and even more preferably ≤3°.

Here, the so-called male multipoint connector main body can be used synonymously with the term plug multipoint connector main body or pin multipoint connector main body. It is understood that contacting elements (for example, male contacting elements) are arranged in the male multipoint connector main body or in the plug multipoint connector main body or in the pin multipoint connector main body, which can have a square, rectangular, oval or even round cross-section, for example. The individual contacting elements are then usually contacted by a mating plug-in element (for example, a female mating contacting element) arranged in a mating connector element.

It goes without saying that the plug receptacles are formed to be open on at least one side. For example, a plug receptacle can have a circumferential collar starting from the base plate, which is open on its side facing away from the base plate, so that a plug can be inserted into the plug receptacle. However, it is also possible that such a collar, which serves as a mechanical guide element, has lateral slots, for example in order to achieve a certain flexibility. In this case, the collar and therefore also the plug receptacle is formed to be at least partially open on more than one side.

In the same way, the connecting pocket is formed to be open on at least one side. This means: the connecting pocket can, for example, be formed such that it is also at least partially open on at least one further side, for example on a side that is formed to be perpendicular to the first direction.

According to an example embodiment of the present invention, at least one connecting pocket is provided in the male multipoint connector main body. This at least one connecting pocket is arranged between two adjacent plug receptacles. Thus, it can also be sufficient for a male multipoint connector main body with, for example, three, four or even more plug receptacles if only a single connecting pocket is provided. Of course, a plurality of connecting pockets can also be provided. A preferred, exemplary embodiment provides a connecting pocket between every two adjacent plug receptacles. Of course, a plurality of connecting pockets can also be arranged in the region between adjacent plug receptacles.

Thus, by providing open connecting pockets, which are substantially open in the same direction as the plug receptacles, distortion can be avoided during or after the production of the male multipoint connector main body and, in particular in the case of very long main bodies of, for example, more than 80 mm in length and/or main bodies with at least two plug receptacles, deflection in the longitudinal direction can also be avoided or at least limited to a value of at most 0.5 mm, preferably to a value of at most 0.3 mm. In particular, the connecting pockets can prevent angular distortion of the plug receptacles. This makes it possible to minimize distortion of the male multipoint connector main bodies without the need to use only isotropically shrinking materials or to use two-component injection molding or other complex measures to prevent distortion of the male multipoint connector main bodies, such as reinforcing elements that have to be provided separately.

In particular, the plug receptacles, which are open on one side, can have different geometries and can also be designed for different plug-in elements. The plug receptacles, which are open on one side, are preferably formed to be cup-shaped with only one open side and, in particular, are substantially square, preferably with rounded corners. It is also preferable that the height of the plug receptacles, which are open on one side, of the main body is the same. A plug-in element (mating connector) of the plug receptacle is preferably completely received in the plug receptacle. An electrical contact to the plug-in elements is established inside the plug receptacles. For this purpose, in each case a plurality of contacting elements such as contacting pins or flat blades or the like can be arranged in the plug receptacles, for example. Such contacting elements can, for example, be shot into the finished male multipoint connector main body or inserted in some other way. The plug receptacles can have different geometric dimensions and in particular also preferably have additional guide elements and/or elements (so-called coding elements) for correct insertion of the plug-in elements in the correct position and correct location. The plug-in elements have socket contacts, for example, which can make electrical contact with the contacting elements.

Further preferred are the first direction Z1, in which the plug receptacle projects from the plane E of the base plate, and the second direction 22, in which the connecting pockets project starting from the plane E, perpendicular to the plane E.

Preferred developments of the present invention are disclosed herein.

Preferably, according to an example embodiment of the present invention, the base plate of the plug receptacles has a first wall thickness D1 and the side walls of the plug receptacles have a second wall thickness D2. The inequality $0.3\times D1<D2<0.65\times D1$ is fulfilled. In particular, $D2=0.5\times D1$. This is an advantageous way of ensuring particularly good stability of the male multipoint connector main body, in particular along the extension direction or along the plane E.

At the same time, material can be advantageously saved, since the second wall thickness D2 of the side walls primarily have a guiding and positioning function for the plug-in elements and therefore do not require the same stability as the base plate.

Further advantageously, the plug receptacles can be positioned closer to one another, which saves valuable space. Furthermore, such a design advantageously promotes a particularly low-distortion configuration of the male multipoint connector main body, since relatively little volume projects from the plane E.

In a further development of the present invention, the second wall thickness D2 of the side walls of the plug receptacles, which project from the base plate, is equal to a third wall thickness D3 of the pocket side walls of the connecting pocket. As a result, an even distribution of the injection material, in particular during an injection molding process, is ensured. However, other production methods (for example, milling from solid material or 3D printing, etc.) also result in particularly simple production. It is understood that the inequality stated above does not necessarily have to be fulfilled for the proposed further development.

In a further development of the present invention, a fourth wall thickness D4 of a base plate of the connecting pockets is equal to the third wall thickness D3 of the pocket side walls of the connecting pockets. As a result, the production process in particular is advantageously simplified. This also considerably simplifies quality control in the form of thickness measurement. It is understood that the example further development can be carried out independently of the two further developments described above. Thus, it can be used as an alternative or in addition to these.

According to a further preferred embodiment of the present invention, the plane E is a center plane of the base plate, wherein the side walls of the plug receptacles have a first length L1 starting from the center plane of the base plates and wherein the pocket side walls of the connecting pockets have a second length L2 starting from an inner base of the base plate of the connecting pockets up to the center plane of the base plate, wherein the first length L1 is at least twice as long as the second length L2. As a result, a particularly simple and cost-effective male multipoint connector main body is advantageously achieved, since hollowing out such pocket depths (given by the second length L2) or demolding such pocket depths is still possible with reasonable effort and without the need for costly reworking. The tools required for such pocket depths can be produced and maintained cost-effectively. Furthermore, connecting pockets with such a pocket depth require relatively little space on the side of the male multipoint connector main body that faces away from the side of the plug receptacles. Electronic components, for example of a control device, can be arranged on the side of the connecting pockets. Usually, the space available on such side is extremely limited. Thus, a reasonable compromise between additional space requirements and a reduction in distortion of the male multipoint connector main body can be achieved with such a pocket depth. Furthermore, such pocket depths can advantageously be used to provide a particularly low-distortion male multipoint connector main body. In other words, this ensures that the second length L2 of the pocket side walls is sufficiently long to avoid the distortion of the male multipoint connector main body. In principle, depending on the application, other pocket depths are also possible. The center plane of the base plate of the plug receptacles lies in the middle of the base plate, so that one thickness of the base plate is divided into two equal partial regions. It is understood that the proposed further development can be undertaken independently of the other proposed further developments. Thus, it can be used as an alternative or in addition to these.

According to an example embodiment of the present invention, the inequality $0.15\times L1<L2<0.5\times L1$ is also preferably fulfilled and in particular the inequality $0.2\times L1<L2<0.38\times L1$ is fulfilled and $L2=0.33\times L1$ is particularly preferred. As a result, the advantages described above are brought about. In particular, the proposed relations can achieve a particularly advantageous compromise between available space below the plane E (i.e., on the side of the plane E facing away from the side of the plug receptacles) and low distortion. The tools for producing the male multipoint connector main body can also be produced particularly easily for these ratios, or the production process can still be carried out cost-effectively with 3D printing or milling from solid material, etc. Finally, quality control, for example in the form of measuring dimensions and/or material thicknesses, can be carried out highly cost-effectively with such relations.

According to an example embodiment of the present invention, it is further preferred that an open side of the connecting pockets ends at the level of an inner base of the base plate of the plug receptacle or that an open side of the connecting pockets is at the level of an inner base of the base plate of the plug receptacle. As a result, a particularly simple geometry for the connecting pocket is advantageously provided. This enables particularly a simple and cost-effective production and quality control.

According to an example embodiment of the present invention, a particularly simple and cost-effective structure of the male multipoint connector main body is achieved if at least one side wall of the plug receptacle and one side wall of the connecting pocket lie in a common wall plane W. Preferably, a plurality of or even all side walls of the plug receptacle and pocket side walls of the connecting pocket, which, for example, extend perpendicularly or substantially perpendicularly to an extension direction of the male multipoint connector main body, lie in a common wall plane W.

Particularly preferably, according to an example embodiment of the present invention, all side walls of the plug receptacles lie along the first direction Z1 perpendicular to the extension direction of the male multipoint connector main body and in each case lie in a common wall plane W with one of the pocket side walls of the connecting pockets. The arrangement of the first direction perpendicular to the extension direction of the male multipoint connector main body makes it particularly easy to produce the male multipoint connector, since in this case the mating connectors are also inserted into the plug receptacles perpendicular to the plane of extension. As a result, the contacting elements are particularly easy to insert into the male multipoint connector main body.

According to an example embodiment of the present invention, in order to further improve the rigidity of the male multipoint connector main body and to make production advantageously cost-effective, the male multipoint connector main body is an injection-molded part. For example, a plastics material reinforced with fibers can be used as the material. The fiber-reinforced plastics material increases rigidity, wherein the male multipoint connector main body can still be produced easily and cost-effectively by means of injection molding.

According to a further preferred embodiment of the present invention, the fibers in the side walls of the plug receptacle and the pocket side walls of the connecting pockets are aligned substantially perpendicular (±20° to the perpendicular direction, preferably ±10° to the perpendicular direction) to the base plate of the plug receptacles. In particular, a proportion of the fibers of 75% to 100% is aligned substantially perpendicular to the base plate of the plug receptacles. The proportion of fibers that are aligned perpendicular to the base plate of the plug receptacles is particularly preferably in a range from 85% to 95% and is in particular 90%. As a result, a particularly high degree of rigidity and robustness of the side walls of the plug receptacles is advantageously ensured, so that they are protected against damage even upon frequent plugging processes and/or upon plugging processes that involve the application of high force. At the same time, the wall thickness of the side walls can be reduced so that material can be saved and the plug receptacles can be moved closer together, which saves valuable space. The same orientation of the fibers is advantageously provided for the connecting pockets as a kind of compensation element against anisotropic shrinkage. It is understood that the longitudinal direction of the fibers, i.e. their longest extension direction, forms the reference point for determining the angle to the base plate.

According to an example embodiment of the present invention, the fibers used in the fiber-reinforced plastics material are preferably glass fibers, wherein the plastics material further preferably is polyamide or polybutylene terephthalate. As a result, a particularly cost-effective and easy-to-produce male multipoint connector main body is advantageously achieved. Further advantageously, such a male multipoint connector main body is particularly stable with relatively low material usage. It also has a sufficiently high heat resistance (for example, up to at least 80° C.) and can withstand low temperatures (for example, −40° C.) without damage.

The glass fibers also preferably have a proportion of the material of the male multipoint connector main body in a range from 20 to 40% by volume and in particular 30% by volume. As a result, a particularly high level of stability with little material usage is advantageously achieved.

According to an example embodiment of the present invention, the material for the male multipoint connector main body is preferably PA66 GF30 or PBT GF30. As a result, a particularly cost-effective male multipoint connector main body that is easy to produce, has high stability with low material usage and is highly resistant over a wide temperature range (for example, −40° C. to 80° C.) and is also highly resistant to media (for example, aggressive media such as salt water, brake fluid, etc.) is achieved.

Particularly preferably, a first width B1 of the plug receptacles is greater than or equal to a second width B2 of the connecting pockets. The first width B1 of the plug receptacles and the second width B2 of the connecting pockets can be determined in the plane E, for example. They preferably extend substantially perpendicular to the longitudinal extension direction of the male multipoint connector main body. As a result, the connecting pockets advantageously take up particularly little valuable space below the plane E and material can advantageously be saved. As a result, the male multipoint connector main body is more compact and lighter.

Furthermore, the present invention relates to an electric plug connection comprising a male multipoint connector main body or plug multipoint connector main body according to the present invention.

The present invention also relates to a control device for a vehicle, in particular a motor vehicle, having an electric plug connection having a male multipoint connector main body according to the present invention.

BRIEF DESCRIPTION OF THE DRAWINGS

In the following, preferred exemplary embodiments of the present invention are described in detail below with reference to the figures.

DETAILED DESCRIPTION OF EXAMPLE EMBODIMENTS

With reference to FIGS. 1 to 4, a male multipoint connector main body 1 or plug multipoint connector main body or pin multipoint connector main body according to a first preferred exemplary embodiment of the present invention is described in detail below.

Figure 1:
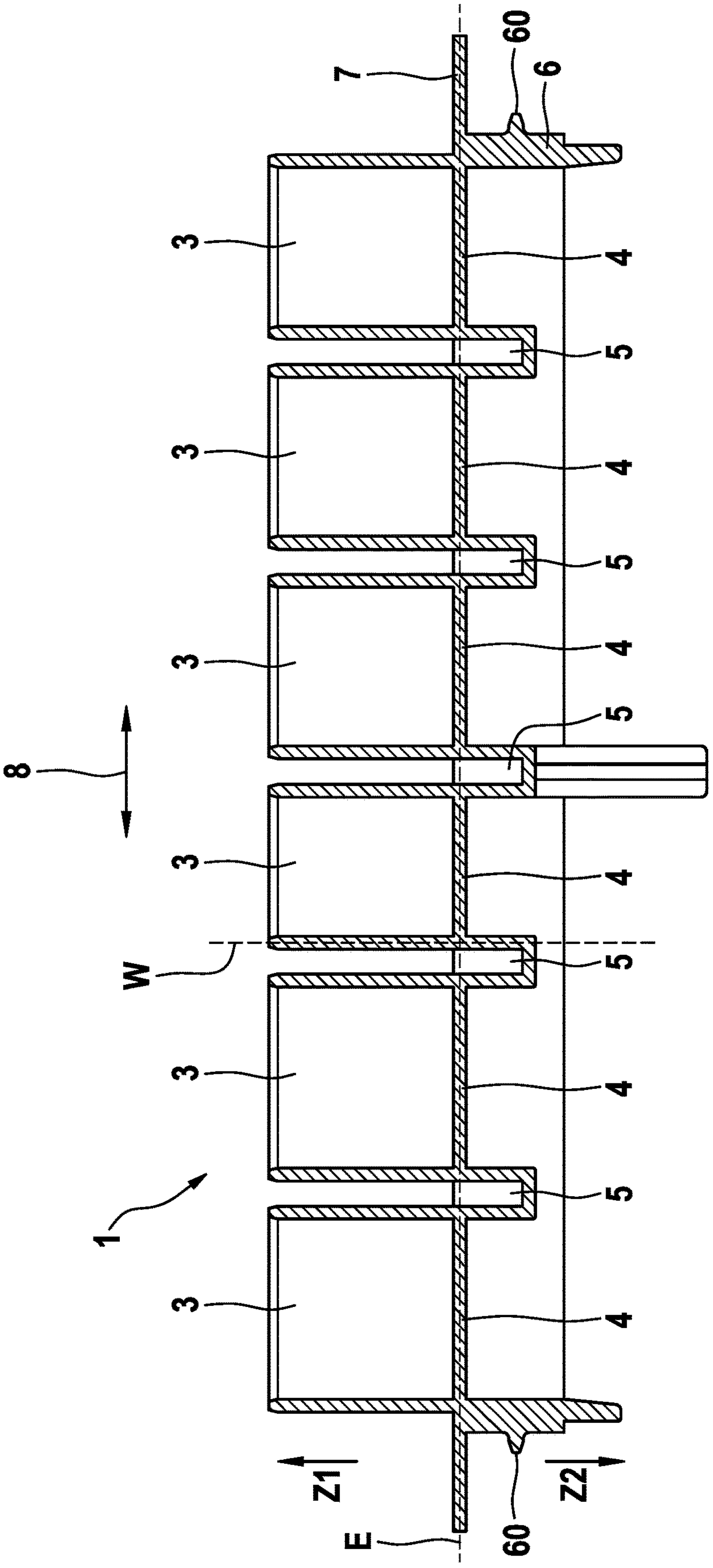
FIG. 1 is a schematic longitudinal sectional view of a male multipoint connector main body according to a preferred first exemplary embodiment of the present invention.
Figure 2:
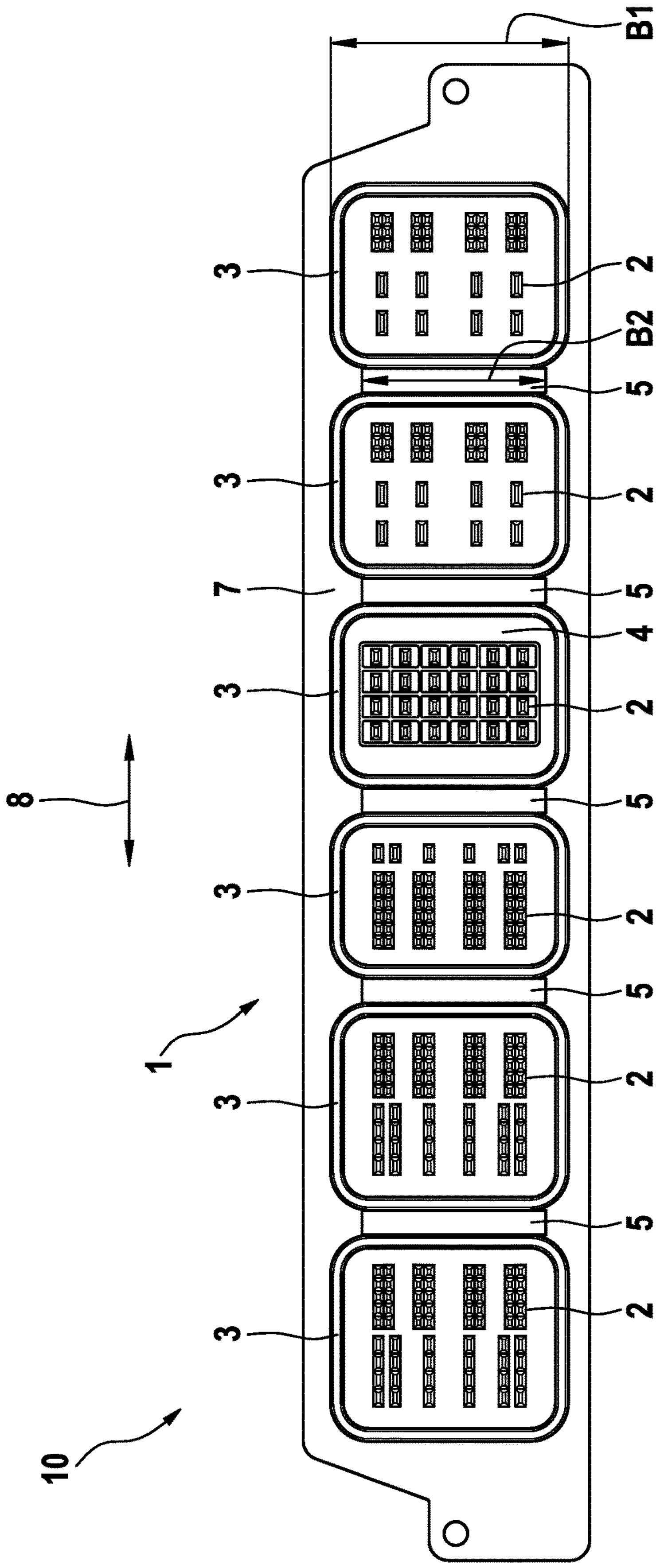
FIG. 2 is a schematic top view of the male multipoint connector main body of FIG. 1.

As can be seen from FIGS. 1 and 2, the male multipoint connector main body 1 comprises a plurality of plug receptacles 3, which are open on one side. The plug receptacles 3 are arranged in a row in an extension direction 8 of the male multipoint connector main body 1. In this exemplary embodiment, the connector receptacles or plug receptacles 3 are, solely by way of example, formed to be cuboid-shaped with rounded corners and precisely one open side 30. They can also have other basic shapes (for example, trapezoidal, round, triangular, etc.) and can be formed to be slotted or perforated on the sides, for example.

As can be seen in particular from FIG. 2, the plug receptacles 3 have different sizes. The plug receptacles 3 are designed to receive plug-in elements not shown, for example connectors of a cable harness or the like.

As can also be seen from FIG. 2, the plug receptacles 3 here all have the same first width B1 solely by way of example. The first width B1 defines the width perpendicular to the extension direction 8 of the male multipoint connector main body 1.

Figure 3:
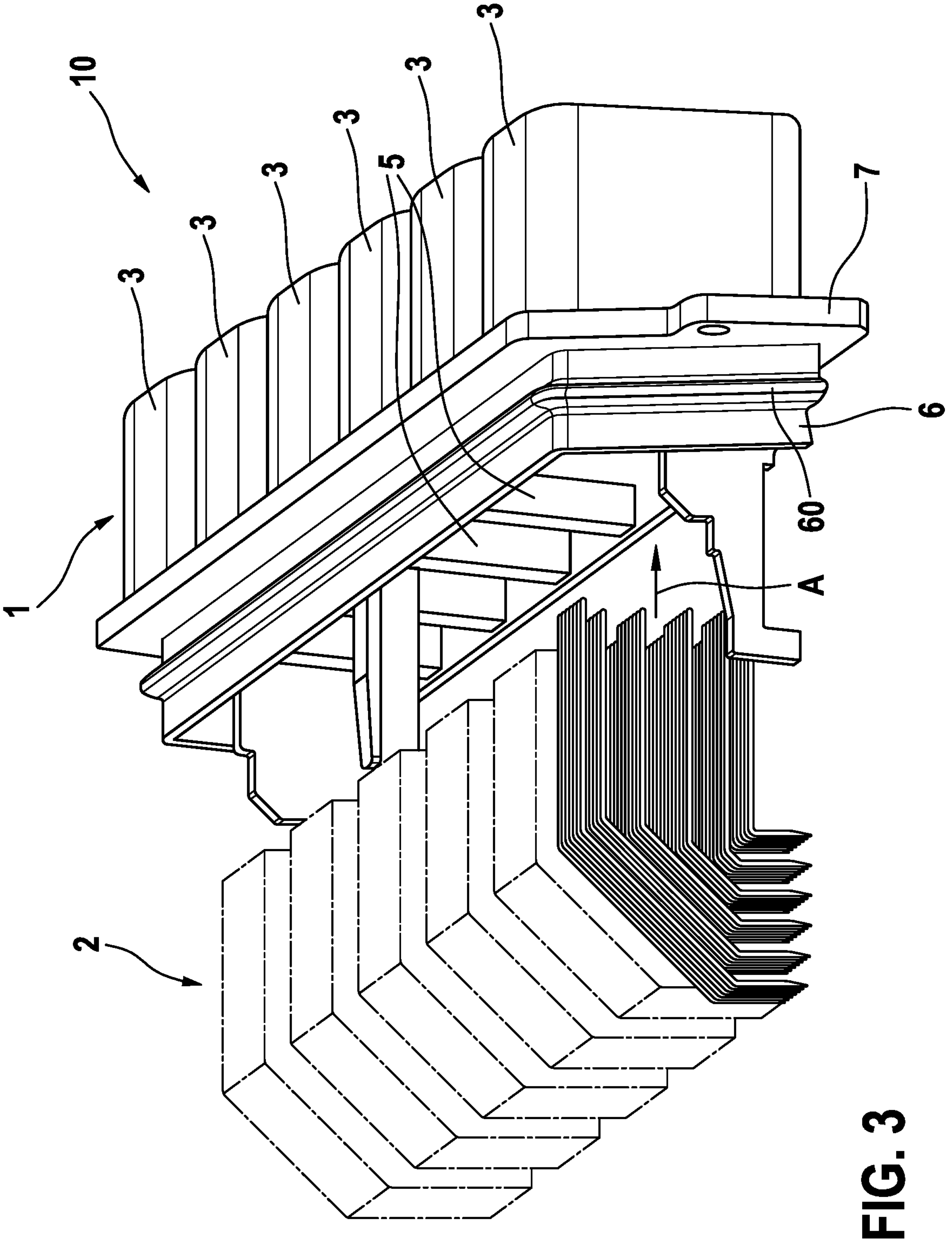
FIG. 3 is a schematic, perspective view of the male multipoint connector main body of FIG. 1 and a plurality of contacting elements to be mounted on the male multipoint connector main body in the form of pins for electrical contacting.

The male multipoint connector main body 1 is part of a male multipoint connector 10 or plug multipoint connector or pin multipoint connector, which, as shown schematically in FIG. 3 in a kind of exploded view, has a plurality of (flat) blades or (flat or round) pins 2 (generally: contacting elements with any cross-section) for electrical contacting. As can be seen from FIG. 2, the pins have different shapes (here: square and rectangular cross-sections) and, in a finished or assembled state, enter through the male multipoint connector main body into an inner region of the open plug receptacles 3. They can, for example, be shot or inserted into the male multipoint connector main body 1 in an initially unbent state and subsequently bent into the shape shown in FIG. 3.

Thus, the male multipoint connector 10 shown here solely by way of example is a high-pole male multipoint connector, which is designed for electrical contacting of a control device of a motor vehicle, for example. Here, the male multipoint connector 10 must fulfill the highest dimensional requirements in order to ensure precise contacting of the pins 2 on a printed circuit board or the like and precise contacting with contacts in a plug-in element inserted into a plug receptacle 3 (not shown here). Furthermore, a secure seal must also be provided for the plugged connection between the plug receptacles and the plug-in elements. Finally, a media seal should be ensured from the upper side of the male multipoint connector 10 (side of the plug receptacles) to the lower side of the male multipoint connector 10.

In this embodiment, the male multipoint connector main body 3 is solely by way of example an injection-molded component, wherein a plastics material reinforced with fibers preferably is used as the material for the injection molding. After the male multipoint connector main body 3 has been injection-molded, in this exemplary embodiment the pins 2 are then pierced or shot in from one side of the male multipoint connector main body 1 through base plates 4, which form the base of each plug receptacle 3. It is understood that other production methods are also possible, for example milling from solid material or 3D printing, etc. It is further understood that other materials can also be used, for example a plastics material that contains no filler material or that contains spherical fillers, for example. In principle, ceramics, etc. can also be used.

As can also be seen from FIG. 1 in particular, a connecting pocket 5, which is open on one side, is arranged in each case between the adjacent plug receptacles 3. The connecting pocket 5 connects the plug receptacles 3, which in each case are arranged adjacent to one another. It is understood that a connecting pocket 5 does not necessarily have to be arranged in each case between all the adjacent plug receptacles 3.

A plane E, in which the base plates 4 of the plug receptacles 3 are located, divides the male multipoint connector main body 1 into an upper part, in which the plug receptacles 3 are arranged, and a lower part, on or in which the connecting pockets 5 are arranged.

Thus, the plug-in receptacles 3 project starting from the plane E, perpendicular in this exemplary embodiment, in a first direction Z1 and the connecting pockets 5 project starting from the plane E, perpendicular in this exemplary embodiment, in a second direction Z2, opposite to the first direction Z1. Here, the connecting pockets 5 also in each case have, by way of example, only one open side 50, wherein the open side 50 of the connecting pockets 5 and an open side 30 of the plug receptacles are directed in the same direction, specifically the first direction 21, by way of example.

As can be seen from the top view of FIG. 2, the connecting pockets 5 have a second width B2, which is defined perpendicular to the extension direction 8. The second width B2 is smaller than the first width B1 of the open plug receptacles 3. The second width B2 lies within a range of 75% to 90% of the first width B1 (0.75×B1 to 0.9×B1).

In a top view (FIG. 2), the connecting pockets 5 here also have a substantially rectangular shape, although they are formed to be significantly narrower in the extension direction 8 than the plug receptacles 3. For example, the length along the extension direction 8 is approximately 5% to 20% of the length of the adjacent plug receptacles 3 along the extension direction 8. For example, connecting pocket 5 has a length of at least 0.5 mm, preferably at least 1 mm, along the extension direction 8. In this manner, it can be particularly easy to fabricate the connecting pocket 5. It can then counteract the distortion particularly well. The length of a connecting pocket 5 along the extension direction can, for example, preferably be in a range between 0.5 mm and 7 mm, preferably in a range between 1 mm and 5 mm. In this manner, it can be easy to fabricate the connecting pocket 5. On the one hand, it can apply enough counter-stress to minimize distortion, while at the same time counteracting any weakening or instability of the male multipoint connector main body 1.

As can be seen from FIGS. 1 and 2, a separate connecting pocket 5 is thus formed in each case between all the adjacent plug receptacles 3. Since the connecting pockets 5 are located on the other side of the plane E (lower part) starting from the plane E compared to the plug receptacles 3 (upper part), compensation can be made for dimensional inaccuracies and, in particular, distortion that can occur during the injection molding process (or also during 3D printing, etc.) of the male multipoint connector main body 1. The selection of material is then no longer important, i.e. dimensional stability is achieved with materials such as filler-free plastics materials and plastics materials with, for example, spherical fillers along with plastics materials with fibrous fillers. This enables a highly free selection of material with maximum dimensional accuracy without special production techniques (2-component injection molding) and without special inserts to minimize distortion. At the same time, this goal can be achieved with only a small amount of additional space required in the lower part. By selecting the geometric parameters of the connecting pocket 5, it is thus possible to specifically influence a distortion during the injection molding process using very simple and cost-effective means and with very little need for additional space and additional material.

In this exemplary embodiment, the connecting pockets 5 also have a cuboid structure with precisely one open side 50, although other sides can also be designed to be at least partially open.

Figure 4:
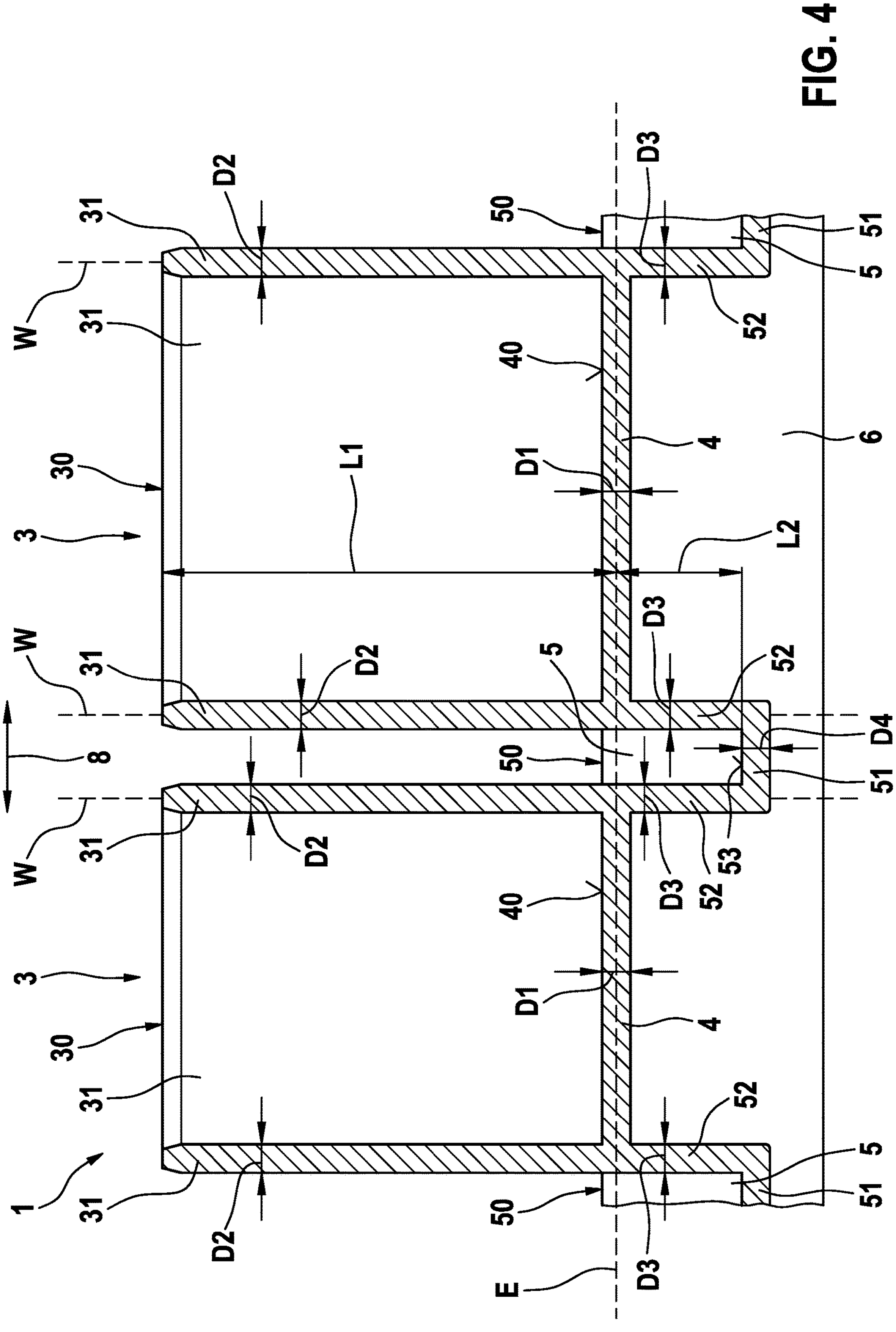
FIG. 4 is a schematic, enlarged partial sectional view of the male multipoint connector main body of FIG. 1.

FIG. 4 shows a sectional view through the male multipoint connector main body 1 from FIG. 1. The connecting pockets 5 have a bottom plate 51 along with four pocket side walls 52. The bottom plate 51, which is furthest away from the plane E, has an effect corresponding to a tension rod in the extension direction 8. As a result, in particular, an angular distortion on the plug receptacles 3, which can occur on the side walls 31 of the plug receptacle due to the expansion of the plug receptacles 3 in the first direction Z1, is avoided.

FIG. 4 shows in detail two adjacent plug receptacles 3 with different geometries, in particular different (longitudinal) dimensions in the extension direction 8.

As can also be seen from FIG. 4, the base plate 4 of the plug receptacles 3 has a first wall thickness D1 and the side walls 31 of the plug receptacles 3 have a second wall thickness D2. The first wall thickness D1 is twice as large as the second wall thickness D2.

Furthermore, the connecting pockets 5 have a third wall thickness D3 of pocket side walls 52 of the connecting pocket 5. A fourth wall thickness D4 of the bottom plate 51 of the connecting pockets 5 is equal to the third wall thickness D3. Thus, in this exemplary embodiment, the first wall thickness D1 is twice as large as the second wall thickness D2. The second wall thickness D2, the third wall thickness D3 and the fourth wall thickness D4 of the plug receptacles 3 and the connecting pockets 5 are the same size. Other ratios are also possible.

Furthermore, the side walls 31 of the plug receptacles 3, which are perpendicular to the extension direction 8, lie in a common wall plane W with the pocket side walls 52 of the connecting pockets 5. Thus, the wall planes W intersect the plane E at a right angle. Here, the wall planes W are all parallel to one another.

As can further be seen from FIG. 4, the side walls 31 of the plug receptacles 3 have a first length L1 starting from the plane E, which forms a center plane of the base plates 4, wherein the pocket side walls 52 of the connecting pockets 5 have a second length L2 starting from an inner base 53 of the bottom plate 51 up to the center plane of the base plate 4. Here, the following is selected for illustration purposes in this exemplary embodiment: L2 is approximately 33% of L1. Thus, the second length L2 of the connecting pockets 5 is only approximately one third of the first length L1 of the plug receptacles 3. In this way, the second length L2 does not protrude unnecessarily far into the lower part, in which, for example, a printed circuit board of a control device can be arranged. For example, the second length L2 of a connecting pocket 5 can be in a range between 6 mm and 15 mm, preferably in a range between 8 mm and 12 mm.

Furthermore, as can be seen in detail in FIG. 4, one open side 50 of the connecting pockets 5 is at the level of the inner base 40 of the plug receptacle 3. In this exemplary embodiment, the connecting pocket 5 thus has no walls of its own, which protrude, for example, via the inner base 40 into the upper part of the male multipoint connector main body 1.

As can also be seen from FIGS. 1 to 3, the male multipoint connector 10 also comprises a circumferential edge region 7, which runs completely around the arrangement of the plug receptacles 3. As can be seen in FIG. 1, the circumferential edge region 7 is at the level of the base plates 4 of the plug receptacles 3. Here, the circumferential edge region 7 provides additional stiffening for the male multipoint connector 10.

As can also be seen from FIGS. 1 and 3, in this embodiment the male multipoint connector 10 also comprises, by way of example, a circumferential stiffening edge 6. The circumferential stiffening edge 6 projects at an angle of approximately 90° from the circumferential edge region 7 in the direction of the second direction 22, in this exemplary embodiment in the form of a collar. The circumferential stiffening edge 6 also has a stiffening rib 60. The stiffening rib 60 projects towards the outer side of the circumferential stiffening edge 6 (radially outwards). As can be seen from FIG. 1, the stiffening rib 60 is arranged somewhat closer to the plane E than the inner base 53 of the connecting pockets 5 is to the plane E.

Thus, by providing the connecting pockets 5, the open side 50 of which is directed substantially in the same direction as the open side 30 of the plug receptacles 3, specifically in the direction of the first direction 21, a distortion of the male multipoint connector 10 can be avoided. As a result, excellent dimensional accuracy of the male multipoint connector 10 can be achieved in injection molding, but also in 3D printing, etc. In this exemplary embodiment, the material used for the male multipoint connector main body 1 is preferably a plastics material reinforced with glass fibers, in particular polyamide or polybutylene terephthalate. The glass fibers preferably have a proportion of the material of the male multipoint connector main body 1 in a range of approximately 30% by volume. At least 90% of the glass fibers are aligned in the same direction substantially perpendicular (90°±20°) to the plane E.

The male multipoint connector main body can be produced in a simple way, for example as a mass-produced component using injection molding, although freedom from distortion can also be achieved with other production processes and the use of other materials.

Particularly preferably, the male multipoint connector 10 has five or six plug receptacles 3 arranged in a row. Preferably, up to a maximum of 336 poles are provided here in the form of pins 2, wherein the present invention also works with a higher number of contact elements. Preferably, a connecting pocket 5 is provided in each case between each adjacent connector receptacle 3. If n receptacles 3 are thus provided, this preferably results in n−1 connecting pockets. The connecting pockets 5 only marginally increase the weight of the male multipoint connectors of the male multipoint connector main body 1, since the connecting pockets 5 are designed to be open on one side and do not protrude too far into the lower part. Thus, the additional weight of the connecting pockets is only the weight of the pocket side walls 52, since the male multipoint connector 10 according to the present invention no longer has a continuous plate.

Figure 5:
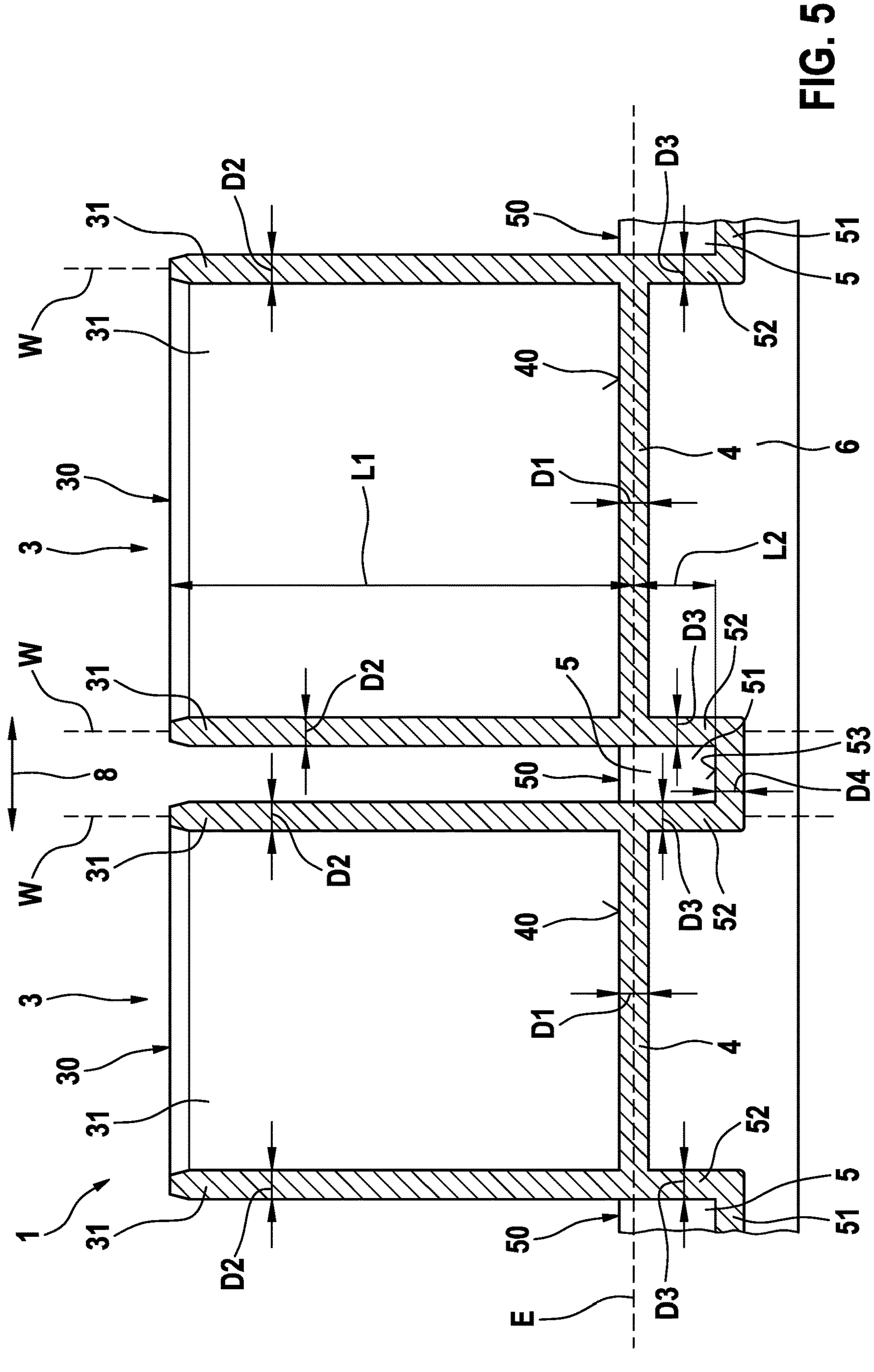
FIG. 5 is a schematic partial sectional view of a male multipoint connector main body according to a second exemplary embodiment of the present invention.

FIG. 5 shows a male multipoint connector main body 1 according to a second exemplary embodiment of the present invention. Identical or functionally identical parts are denoted by the same reference signs as in the first exemplary embodiment.

In contrast to the first exemplary embodiment, in the second exemplary embodiment a second length L2 of the connecting pockets 5 perpendicular to the plane E is designed differently. With the second exemplary embodiment, the second length L2 of the pocket side walls 52 from the inner base 53 of the connecting pockets to the plane E is only approximately 20% of the first length L1 from the plane E to the open side 30 of the plug receptacles 3. Thus, the connecting pockets 5 are formed to be slightly shorter in the direction of the second direction Z2 than in the first exemplary embodiment. As a result, valuable space can be saved in the lower part of the male multipoint connector main body 1 and, for example, a printed circuit board can be placed closer to the male multipoint connector main body 1. Nevertheless, a distortion of the base body 1 of the male connector can be achieved by the effect of the inner base 53 of the connecting pockets 5 as a tension rod. In contrast to the exemplary embodiment in FIG. 4, the following applies to the exemplary embodiment in FIG. 5: the first wall thickness D1, the second wall thickness D2, the third wall thickness D3 and the fourth wall thickness D4 of the plug receptacles 3 and the connecting pockets 5 are all substantially the same size, so that approximately D1=D2=D3=D4 thus applies. Otherwise, this exemplary embodiment corresponds to the preceding exemplary embodiment, and so reference may be made to the description given therein.

With regard to the two embodiments, it should be noted that by providing the open connecting pockets 5, which are open in the same direction as the open plug receptacles 3, a balance between stresses above and below the plane E, which lies in a center of the first wall thickness D1 of the base plates 4, is thus achieved. The connecting pockets 5, which are open on one side, provide a surprisingly simple solution to the problem of distortion in injection-molded parts for the base bodies of male multipoint connectors, even for a person skilled in the art. It should be noted that it is sufficient for the effect of the present invention if the adjacent plug receptacles 3 and the connecting pocket 5 located therebetween have open sides 30, 50, which are directed in substantially the same direction. The directions of the open sides 30, 50 can enclose an angle of, for example, up to 40° to one another, preferably up to 20°.

Figure 6:
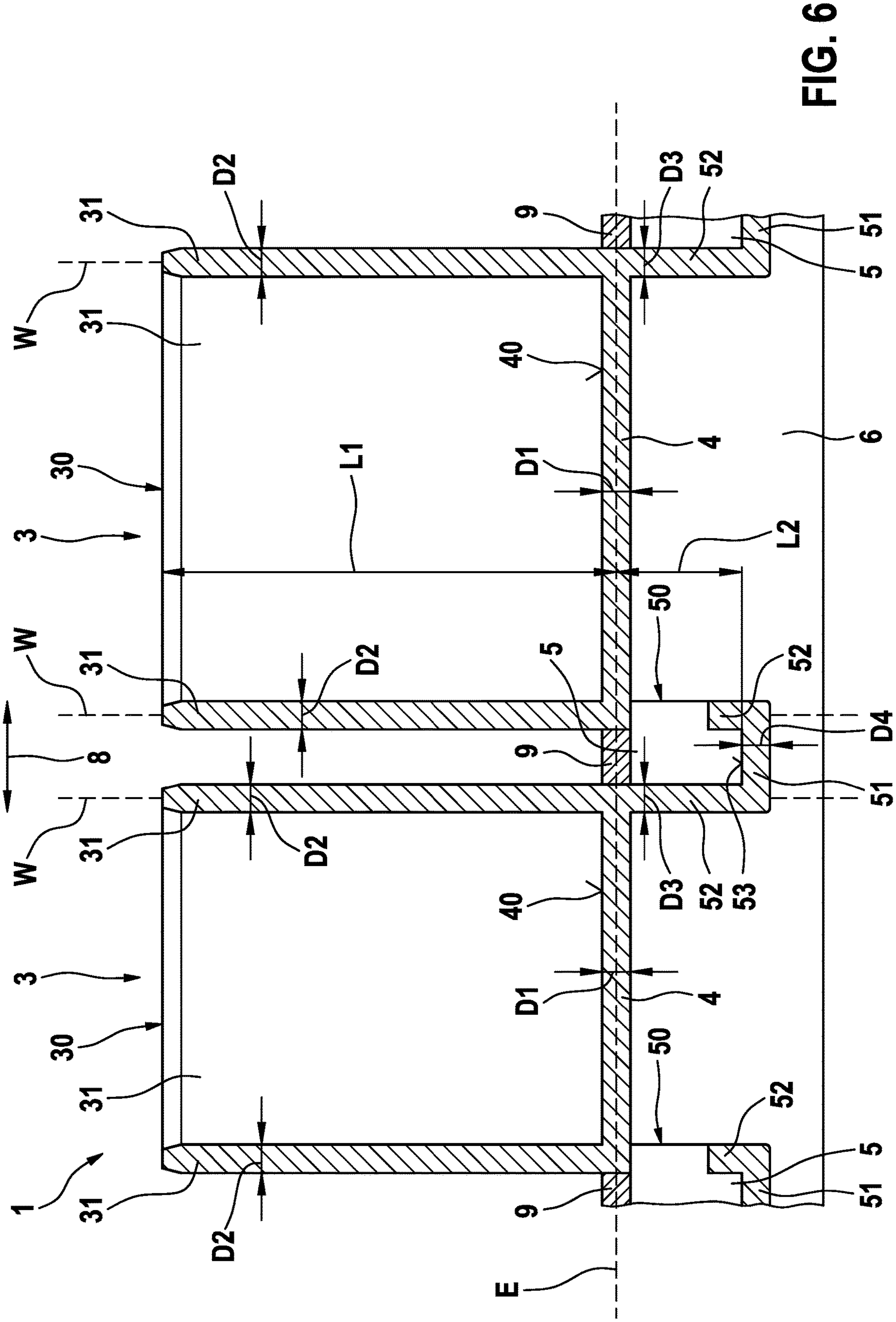
FIG. 6 is a schematic partial sectional view of an alternative male multipoint connector main body, according to an example embodiment of the present invention.

As shown in FIG. 6, a reduction in distortion of the male multipoint connector main body 1 is even achieved in principle if the direction of the open sides 30 of the plug receptacles 3 is at approximately 90° to the direction of the open side 50 of the interposed connecting pocket 5. A male multipoint connector main body 1 is then provided, which has a plurality of plug receptacles 3, which are open on one side, which are arranged in an extension direction 8 of the male multipoint connector main body and which are designed to receive plug-in elements. Each plug receptacle 3 has an individual base plate. A connecting pocket 5, which is open on one side, is arranged in each case between adjacent connector receptacles 3, in particular between all adjacent plug receptacles 3, which interconnects these adjacent plug receptacles 3. Starting from the plane E, in which the base plates 4 lie, the plug receptacles 3 project in a first direction Z1 and the connecting pockets 5 project starting from the plane E in a second direction Z2 in the opposite direction to the first direction Z1. It is then provided that an open side 50 of the connecting pockets 5 and an open side 30 of the plug receptacles 3 are directed towards one another substantially by 90°±40°, in particular ±30°, further in particular ±20°, further in particular ±100 and further in particular ±3°. This can be achieved, for example, by opening one of the pocket side walls 52 or the bottom plate 51 at least partially, for example at least 20% of its surface, preferably at least 30% of its surface. A seal to the upper side of the male multipoint connector main body 1 can then be achieved, for example, by a sealing element 9 or the formation of a very thin sprayed skin or a sealing base with, for example, a maximum of 30% of the second thickness D2 or a maximum of 15% of the first thickness D2. It is understood that the further developments and embodiments indicated above in the description apply analogously to this arrangement and refer back to this arrangement (this applies, for example, to the wall thicknesses and the ratios of wall thicknesses to one another, of lengths of side walls and their ratios to one another, the geometric arrangement relationship of walls, bases and pockets, the method of production, the materials, etc.). In the exemplary embodiments of FIGS. 1 to 4 and 5, an opening would be formed, for example, in the respective right-hand or left-hand side wall 52 of the connecting pockets 5 with this embodiment. Alternating openings (left/right) are also possible.

The invention claimed is:

1. A male multipoint connector main body, comprising a plurality of plug receptacles which are open on one side, are arranged in an extension direction of the male multipoint connector main body, and are configured to receive plug-in elements, wherein each of the plug receptacles has an individual base plate;

wherein between all adjacent plug receptacles of the plug receptacles, there is in each case a connection pocket which is open on one side and which interconnects the adjacent plug receptacles;

wherein the plug receptacles, starting from a plane in which the base plates lie, protrude in a first direction, and the connection pockets, starting from the plane, protrude in a second direction opposite the first direction; and wherein the open side of the connection pockets and the open side of the plug receptacles are oriented substantially in the same direction.

2. The male multipoint connector main body according to claim 1, wherein each of the base plates of the plug receptacles has a first wall thickness D1, and side walls of the plug receptacles have a second wall thickness D2, wherein D2=0.5×D1.

3. The male multipoint connector main body according to claim 1, wherein the open side of the connecting pockets is at the level of an inner base of the base plate of the plug receptacles.

4. The male multipoint connector main body according to claim 1, wherein at least one side wall of a plug receptacle and one pocket side wall of a connecting pocket lie in a common wall plane.

5. The male multipoint connector main body according to claim 4, wherein all side walls of the plug receptacles lie along the first direction perpendicular to an extension direction of the male multipoint connector main body and in each case lie in a common wall plane with one of the pocket side walls of the connecting pockets.

6. The male multipoint connector main body according to claim 1, wherein each of the base plates of the plug receptacles has a first wall thickness D1, and side walls of the plug receptacles have a second wall thickness D2, wherein an inequality $0.3 \times D1 < D2 < 0.65 \times D1$ is fulfilled.

7. The male multipoint connector main body according to claim 6, wherein the second wall thickness D2 of the side walls of the plug receptacles, which project from the base plate, is equal to a third wall thickness D3 of pocket side walls of the connecting pockets.

8. The male multipoint connector main body according to claim 7, wherein a fourth wall thickness D4 of each bottom plate of the connecting pockets is equal to the third wall thickness D3 of the pocket side walls of the connecting pockets.

9. The male multipoint connector main body according to claim 1, wherein:

the plane is a center plane of the base plates, side walls of each of the plug receptacles have a first length L1 starting from the center plane of the base plate of the plug receptacle, pocket side walls of the connecting pockets have a second length L2 starting from an inner base of a bottom plate of the connecting pockets up to the center plane of the base plates, and the first length L1 is at least twice as long as the second length L2.

10. The male multipoint connector main body according to claim 9, wherein an inequality $0.15 \times L1 < L2 < 0.5 \times L1$ is fulfilled.

11. The male multipoint connector main body according to claim 9, wherein an inequality $0.2 \times L1 < L2 < 0.38 \times L1$ is fulfilled.

12. The male multipoint connector main body according to claim 9, wherein $L2 = 0.33 \times L1$.

13. The male multipoint connector main body according to claim 1, wherein the male multipoint connector main body is an injection-molded part and, a plastics material reinforced with fibers is used as a material of the injection-molded part.

14. The male multipoint connector main body according to claim 13, wherein the fibers in the side walls of the plug receptacles and the pocket side walls of the connecting pockets are aligned substantially perpendicularly to the base plates of the plug receptacles.

15. The male multipoint connector main body according to claim 13, wherein the fibers are glass fibers, and wherein the plastics material is polyamide or polybutylene terephthalate.

16. The male multipoint connector main body according to claim 15, wherein the glass fibers have a proportion of the material of the male multipoint connector main body in a range of 20-40% by volume.

17. The male multipoint connector main body according to claim 15, wherein the material is PA66 GF30 or PBT GF30.

* * * * *